July 7, 1953 W. H. PASKE 2,644,503
TRACTION MEANS FOR PNEUMATIC TIRED WHEELS
Filed Feb. 3, 1950
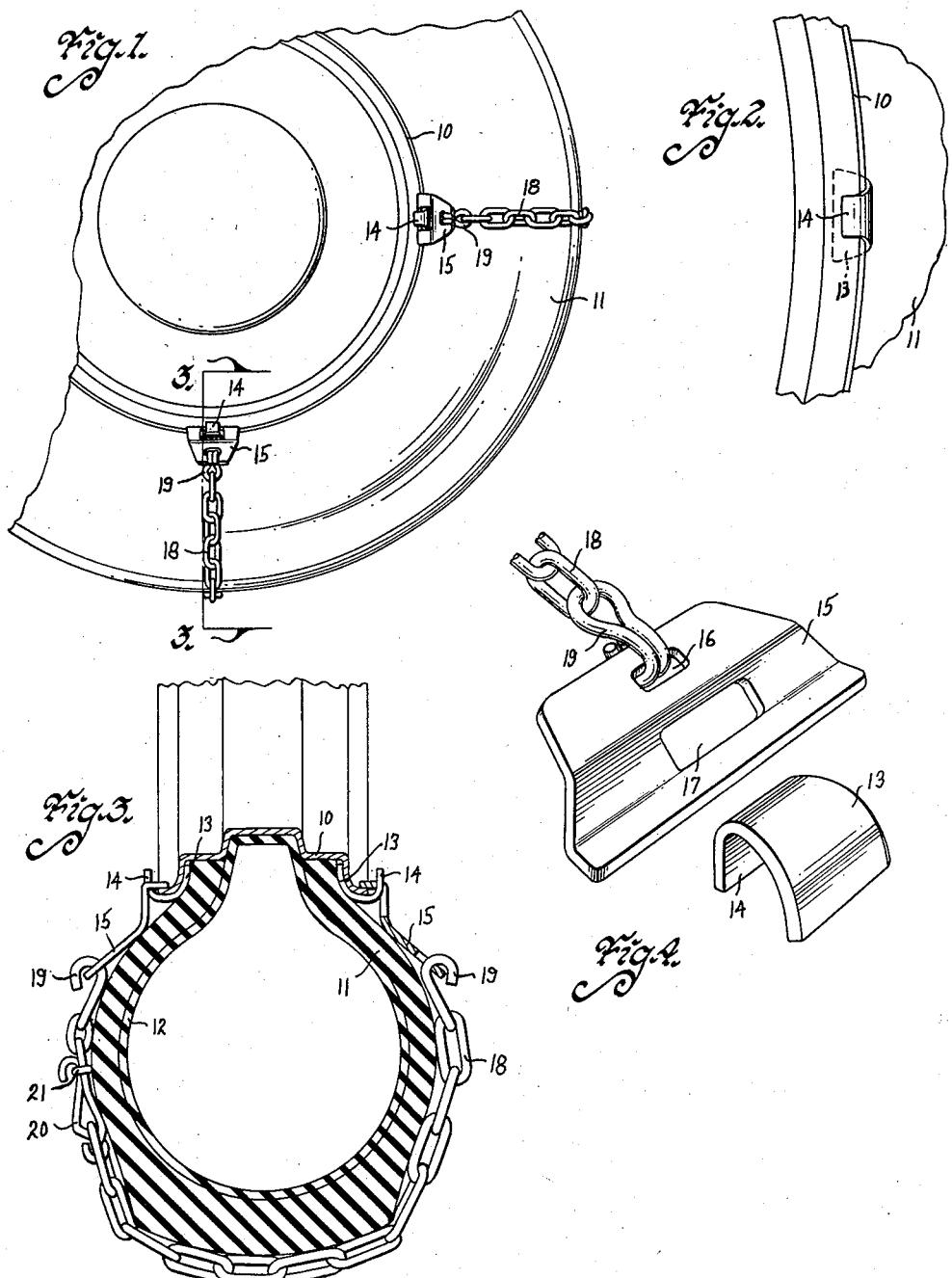
Witness
Edward P. Seeley
Inventor
Wallace H. Paske
by M. Talbert Dick
Attorney Patented July 7, 1953

2,644,503

UNITED STATES PATENT OFFICE 2,644,503

TRACTION MEANS FOR PNEUMATIC TIRED WHEELS

Wallace H. Paske, Wells, Minn., assignor to Clark H. Geppert, Des Moines, Iowa

Application February 3, 1950, Serial No. 142,296

3 Claims. (Cl. 152—233)

My invention relates to a traction chain or the like for pneumatic tired wheels and more particularly to a novel means for attaching the traction element to or detaching it from such a wheel.

The use of chains on the wheels of vehicles for the purpose of increasing traction in snow, mud and the like is, of course, not new. This has commonly been done in two general ways. One method consists of using two elongated chain lengths joined together by a plurality of short transverse chain lengths in spaced relation and designed to be mounted about the periphery of the tire with their free ends joined together by a suitable means. The other method has been to secure one or more individual chain lengths transversely around the tire in spaced relation.

In mounting the longer chain of the first type there are several disadvantages. Ideally, it is accomplished by jacking up the wheel, deflating the tire, mounting the chains and then inflating the tire. In this way the chains can be made tight so as to avoid any slapping against the road surface. Obviously, the circumstances requiring the use of chains is seldom found in a setting permitting their mounting in the ideal manner. Often, the vehicle will already be fast in mud or snow and consequently the difficulties in putting on chains is very apparent. Occasionally, this type of chain can be used by laying it longitudinally on the road surface forwardly or rearwardly of the wheel and moving the vehicle so that the wheel passes onto the chain. The free ends of the chain can then be manually pulled around the wheel and secured. However, if the vehicle is already stuck, it is obvious that this cannot be done and the only way to mount the chains is to jack the wheel up, if that can be done. In cold or muddy weather, it is a very disagreeable task.

The use of individual chains of the second type are easier to use since the wheel need not be jacked up. These are merely secured transversely around the tire by straps or the like and were especially easy to mount on spoked wheels. However, the use of spoked wheels has generally given way to wheels of solid disc construction so that the method of applying these individual chains is no longer capable of being used except by providing openings in the solid disc portion of the current type vehicle wheels, through which the straps or chains can be passed.

The use of chains on vehicle wheels is generally necessary or desirable only for comparatively short periods of time such as when traveling through extremely muddy areas, getting out of mud holes, snow drifts or the like and driving on snow covered roads after recent snows. Usually, after the chains have served their purpose it is desirable to remove them and consequently the ease with which they can be attached to or detached from the wheel is a matter of concern to all who have occasion to use them.

It is therefore an object of my invention to provide a means for quickly and easily attaching a traction chain or the like transversely over a pneumatic tire on a wheel and also for quickly and easily detaching it therefrom. For this purpose my invention consists of a pair of hook or keeper members designed respectively to be frictionally held between the tire and rim on opposite sides of the tire and a pair of slotted connecting plates secured respectively to each end of a length of chain, strap or the like, thereby making it possible to mount the chain transversely around the tire by engaging each connecting member in one of the hooks. More specifically, these connecting plates are provided with a shoulder portion that engages a portion of the rim so that any pulling force transmitted through the chain is directed against the rim and the hooks or keepers serve the chief purpose of preventing the plates from becoming disengaged from the rim.

A further object of this invention is to provide an attaching means of the above class whereby the traction means embraces only the tire and is not required to encircle the rim of the wheel so that by use of this attaching means, traction chains or the like can be used either on wheels of the spoked variety or on disc wheels.

A still further object of this invention is to provide a means for easily attaching a traction chain or the like to a pneumatic tired wheel irrespective of whether the wheel is on a hard surface or mired in mud or snow.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a side view of a fragmentary portion of a pneumatic tired vehicle wheel embodying the use of a traction chain having my attaching means, Fig. 2 is a side view of a fragmentary portion of a rim and tire of a wheel showing the hook member of my invention mounted thereon, Fig. 3 is a cross-sectional view of a tire and rim of a wheel embodying the use of a traction chain with my attaching means taken on the line 3—3 of Fig. 1, and Fig. 4 is a perspective view of the hook and connecting plate members of my attaching means and showing a fragmentary portion of a traction chain secured to the connecting plate.

Referring to the drawings I have used the numeral 10 to designate a vehicle rim having a pneumatic casing or tire 11 in which there is the customary inner tube 12. It is for such a wheel that my invention is more particularly adapted. While Fig. 3 shows a standard pneumatic tire and inner tube, the tube is of no moment as used with my invention and my attaching means can be applied as well to tubeless tires now being manufactured. The numeral 13 designates a substantially U-shaped hook or keeper member which is preferably formed from a flat rectangular metal bar that is bent transversely to its longitudinal axis. Two opposite sides of this bar are tapered inwardly so that one end 14 is narrower than the other as shown in Fig. 2.

A connecting plate 15 is formed from a flat piece of metal and is also tapered to provide one end narrower than the other as shown in Fig. 4. The tapering of either the hook 13 or connecting plate 15 is a matter of taste and is not required to the function of this invention. In the plate 15 I have provided two slots 16 and 17 as shown in Fig. 4. Forwardly of the slot 17 the wide end portion of the plate 15 is bent upwardly at substantially right angles along its longitudinally axis to form a shoulder portion as shown in Fig. 4 and rearwardly of the slot 17 the narrower end portion of the plate 15 containing the slot 16 is bent downwardly along the longitudinal axis thereof but to a lesser degree than the bend or shoulder portion in the wide end.

When using my attaching means, at least two hooks 13 and two connecting plates 15 are required as will later be described in detail.

The numeral 18 designates a length of link chain having an engaging hook 19 on each end and each hook 19 is designed to be secured to one of the plates 15 through the respective slot 16 as shown in Fig. 4.

In operation this attaching means is used in the following manner. The wide end of the hook 13 is placed between the rim 10 and casing 11 as shown in Fig. 2 at any designated point on one side of the wheel. This can be more easily accomplished if the casing is first deflated. The hook 13 is inserted as far as possible until the outside edge of the rim 10 is engaged by the inside surface of the U portion of the hook 13. In this position the narrow end 14 of the hook 13 will be spaced apart from the rim 10 and will extend in a direction toward the hub of the wheel. Another hook 13 is similarly arranged on the other side of the wheel opposite the first placed hook. After the casing is inflated the hooks 13 will be held securely in place by frictional engagement of the rim and casing as shown in Fig. 3. Once in place these hooks 13 need not be removed whether the chain is used or not since they do not interfere in any way with the operation of the wheel. Consequently they can initially be mounted at a time suitable and convenient to the vehicle operator. To attach the chain 18 it is merely necessary to detachably secure one of the plates 15 to the narrow end 14 of one of the hooks 13. This is done by passing the slot 17 in the connecting plate 15 over the end 14 of the keeper 13 so that the shoulder portion of the plate 15 rests on a portion of the rim 10. The chain is then passed around the tire and the other plate is secured to the other hook in a manner similar to the first plate. In this way the plates will not slip either laterally or outwardly because of the keeper and any force or pull transmitted through the chains will be directed against the rim upon which the shoulder portions of the plates are mounted. To remove the chains, the procedure for attaching them is reversed. An adjustable link 20 with the keeper ring 21 may be embodied in the chain to facilitate the mounting or detaching of the chain to the wheel. Such a link has long been used to provide slack when mounting chains or to increase their length and no claim is made to such a link. It is useful with my attaching means but not necessary to its function.

It can readily be seen from the above description that a traction chain embodying this invention could be used with a minimum of effort. No crawling under the vehicle is necessary since it would be known that a hook 13 was located on the inside rim opposite the hook on the outside rim that is visible to the eye. Consequently since no complicated snaps are involved, all that is required is to reach the arm around the tire to a point opposite to the visible hook and secure the chain.

Often just one traction chain will suffice to get the vehicle out of a particular spot but more than one pair of hooks 13 can be mounted at intervals about the rim to be used if necessary. Once the chains have served their purpose, they can be quickly removed so that it is unnecessary to ride for miles on chains when they are not actually needed. This needless use of chains has been a frequent practice because of the work involved in removing them once they are mounted. And obviously, when chains can be and are removed easily as with my invention, they are subjected to less wear and will last longer.

In the drawings I have shown a single chain length secured to the connecting plates 15. It is apparent that more than one chain could be used or that material other than a link chain, such as a strap or the like, could be used with my attaching means and I wish to point out that the particular element used to increase traction, that is a link chain, as shown in the drawings, is given only as illustration and it is the means for attaching such an element to a vehicle wheel and its use in combination with a traction element for pneumatic tires that is the purpose and object of my invention.

Some changes may be made in the construction and arrangement of my traction means for pneumatic tired wheels without departing from the real spirit and purpose of my invention, and it is my intention to cover by my claims, any modified forms of structure or use of mechanical equivalents which may be reasonably included within their scope.

I claim:

1. In combination, a vehicle rim having a pneumatic casing, a hook member secured to one side of said rim, a second hook member secured to the other side of said rim substantially transversely opposite said first hook, an elongated flexible member capable of increasing traction on said casing when arranged transversely around it, an apertured connecting plate secured to each end of said elongated member, means for increasing and decreasing selectively the effective length of said elongated member, and a shoulder portion on each of said connecting plates, each of said connecting plates embracing one of said hook members with said shoulder portions resting on a portion of said vehicle rim; said hooks being held on said wheel rim entirely by the frictional engagement of said wheel rim and said pneumatic casing with said hooks.

2. In a combination with a pneumatic tired wheel having external rim flanges a traction increasing means comprising, a pair of keepers secured to said rim and having at least a portion of them extending past said wheel external flanges toward the center of said wheel, a pair of connecting plates having slots in them, a traction increasing means secured to and between said connecting plates, shoulders formed on said connecting plates adjacent to the connecting plate slots, and a means for increasing and decreasing selectively the effective length of said traction increasing means; said connecting plates slidably embracing the free end of said keepers and the shoulder portions of said connecting plates engaging the external flanges of said wheel rim; whereby pulling forces on said plates are directed against said wheel rim flange and said keepers prevent lateral movement of the connecting plates to prevent their disengagement from said wheel rim flanges.

3. In a combination with a pneumatic tired wheel having external rim flanges a traction increasing means comprising a pair of generally U-shaped keepers having one leg of each inserted and clamped between said tire and said wheel rim, the other leg of each of said keepers extending from the periphery of said wheel rim toward the center of said wheel and past the external flange of said rim, a pair of connecting plates having slots in them, a traction increasing means secured to and between said connecting plates, shoulders formed on said connecting plates adjacent to the connecting plate slots, and a means for increasing and decreasing selectively the effective length of said traction increasing means; said connecting plates slidably embracing the free end of said keepers and the shoulder portion of said connecting plates engaging the external flange of said wheel rim; whereby pulling forces on said plates are directed against said wheel rim flange and said keepers prevent lateral movement of the connecting plates to prevent their disengagement from said wheel rim flanges; said hook-like keepers being held in position entirely by the frictional engagement therewith of the tire and rim of a pneumatic tired wheel between which it is mounted.

WALLACE H. PASKE.

References Cited in the file of this patent

UNITED STATES PATENTS

| Number | Name | Date |
|---|---|---|
| 1,258,204 | Egy | Mar. 5, 1918 |
| 1,492,040 | Lifquist | Apr. 29, 1924 |
| 1,618,869 | Erwin | Feb. 22, 1927 |
| 2,069,978 | Stahl | Feb. 9, 1937 |
| 2,171,592 | Nagle | Sept. 5, 1939 |
| 2,201,397 | Goldenberg | May 21, 1940 |
| 2,255,350 | Devlin | Sept. 9, 1941 |
| 2,522,150 | Weber | Sept. 12, 1950 |